Figure 1:
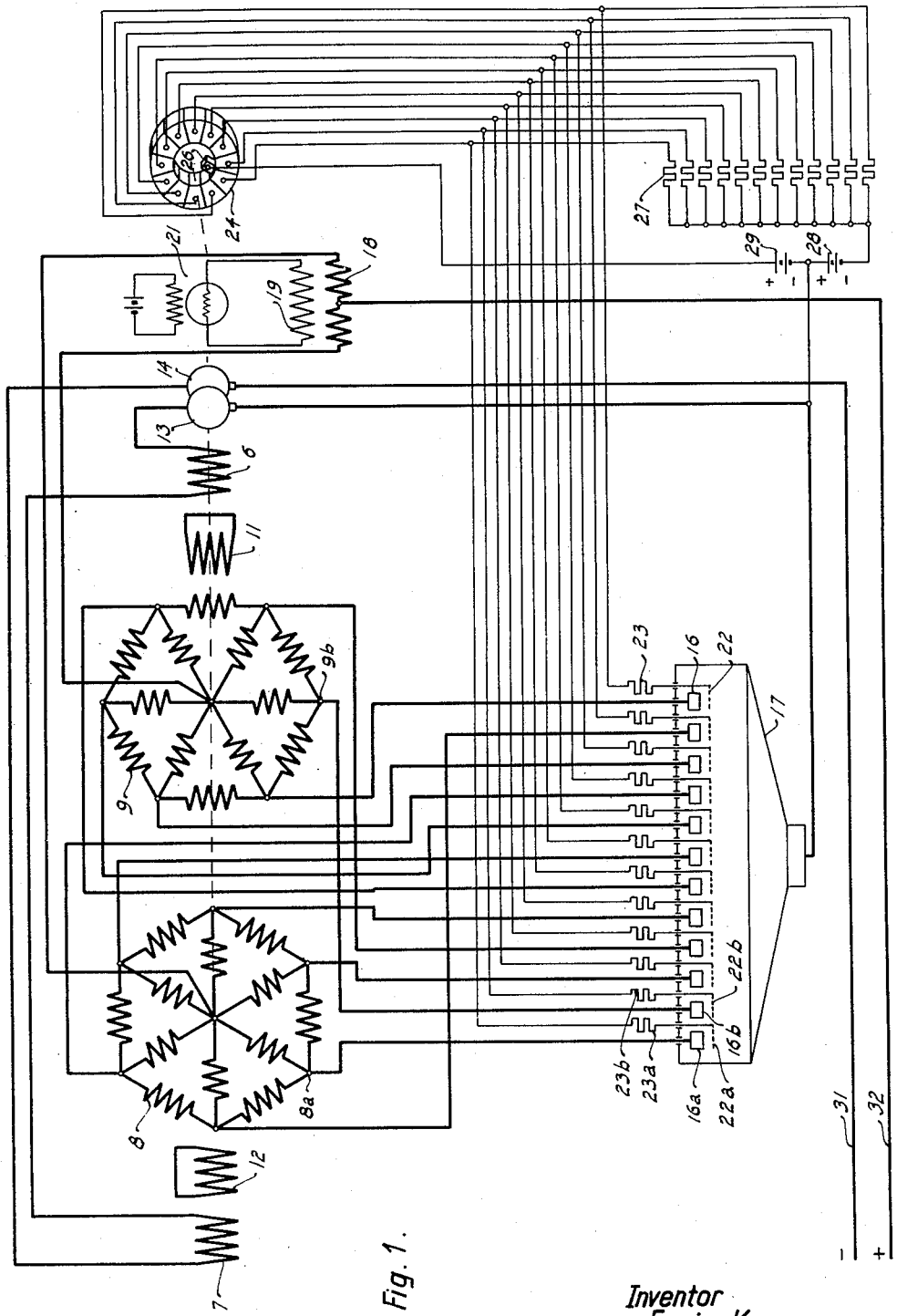

Aug. 15, 1933.                E. KERN                1,922,247
              DEVICE FOR COMMUTATING DIRECT CURRENT
                Filed Nov. 21, 1930          3 Sheets-Sheet 3

Inventor
Erwin Kern
By
    Attorney

Patented Aug. 15, 1933

1,922,247

UNITED STATES PATENT OFFICE 1,922,247

DEVICE FOR COMMUTATING DIRECT CURRENT

Erwin Kern, Wettingen, Switzerland, assignor to Aktiengesellschaft Brown Boveri & Cie., Baden, Switzerland, a joint stock company of Switzerland Application November 21, 1930, Serial No. 497,995, and in Germany November 27, 1929

12 Claims. (Cl. 171—223)

This invention relates to improvements in devices for commutating direct-current in which the operating voltage of the device will not be limited by the voltage of each segment of the usual type of commutator and, therefore, by the number of segments available.

It is well-known that the operating voltage of direct-current motors is limited by the segment voltage and the number of segments of the commutator in consequence of the well-known difficulties of commutation. It is possible to overcome such commutation difficulties if the mechanical commutating structure is replaced by a structure using a commutating process such as takes place in an electric valve e. g. of the metallic vapor electric current rectifier type. When such rectifier is used, the current may be periodically cut off, as desired, by proper anode grid control thereby substituting electronic commutation for the mechanical commutation used heretofore. To secure proper control of the arc flowing within a rectifier such as mentioned above, it is necessary to interrupt the current in the circuit by such means as the introduction of alternating current of suitable magnitude, after which a flow of current can be prevented by maintaining the grids at a potential negative relative to the cathode. To commutate direct-current, the source of current is connected with two points of the motor winding and, after a certain period of time, is also connected to two different points of the winding through other anodes of the rectifier. The current is then extinguished in the circuit connected with the first two points making the grids of the anodes negative and then impressing an alternating voltage of such magnitude on the circuit as to interrupt the current in the circuit. The source is then connected to a third pair of motor winding points and the above cycle of operation is repeated. The current taken off at different points of the winding by the above method is variable but the total current is substantially constant.

It is, therefore, among the objects of the present invention to provide a device for commutating direct current without regard to the number of segments of the usual type of commutator and their voltage as was the case heretofore.

Another object of the present invention is to provide a direct current commutating system which will employ an electric valve preferably of the electric current rectifier type to obtain the desired result.

Another object of the invention is to provide a system for commutating direct current in which conductors are connected to the windings of a direct current motor and an alternating current is superimposed on such conductors to cause the direct current flowing therein to pass, periodically, through zero.

Another object of the invention is to provide a direct-current commutating system in which the windings of the direct-current motor are divided into at least two portions which are similarly and closely magnetically linked.

Another object of the invention is to provide a commutating system in which the windings of an alternating current motor are divided into at least two portions and the flow of current therein is controlled by a polyphase electric current rectifier.

Figure 2:
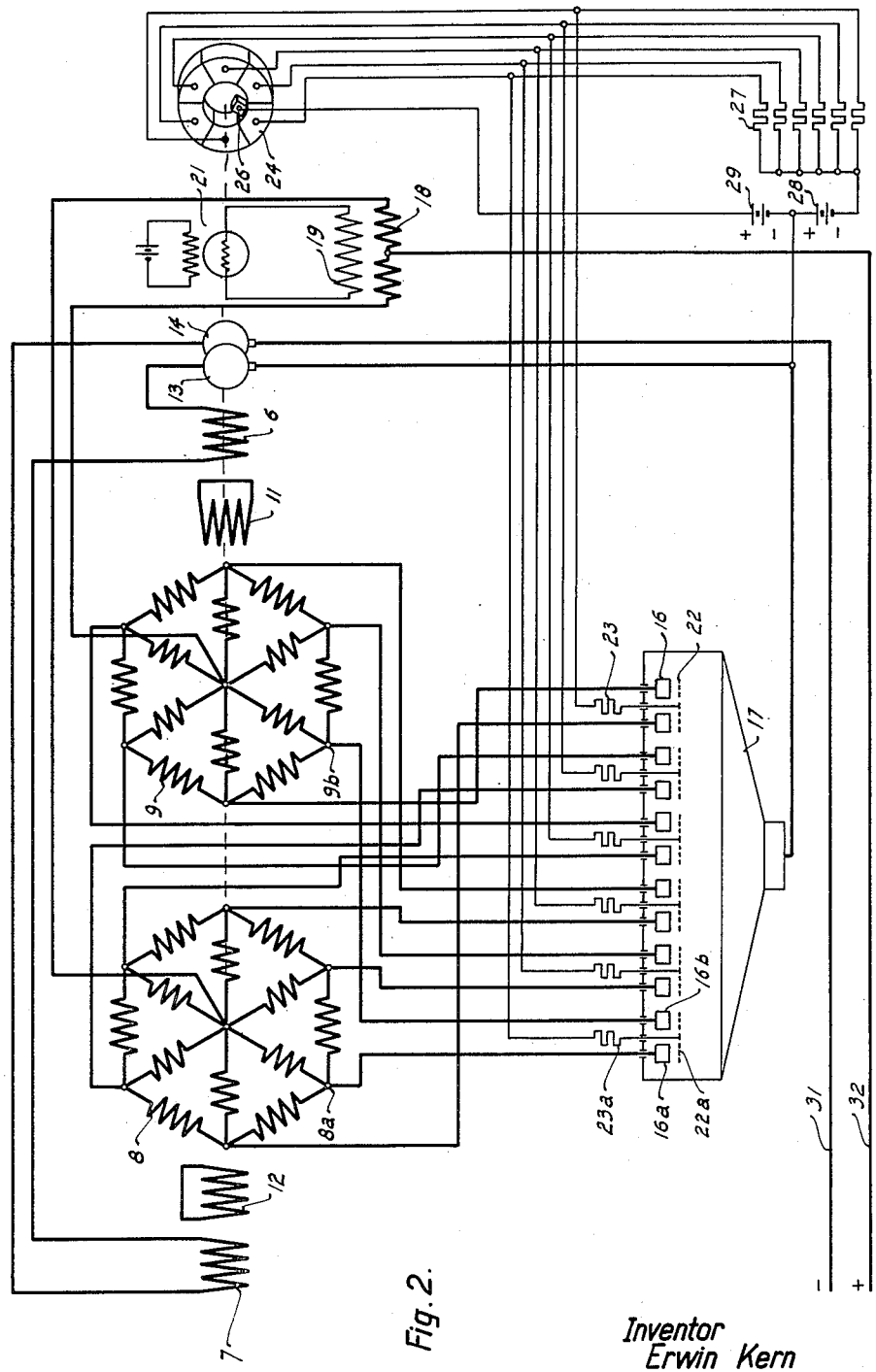
Figure 3:
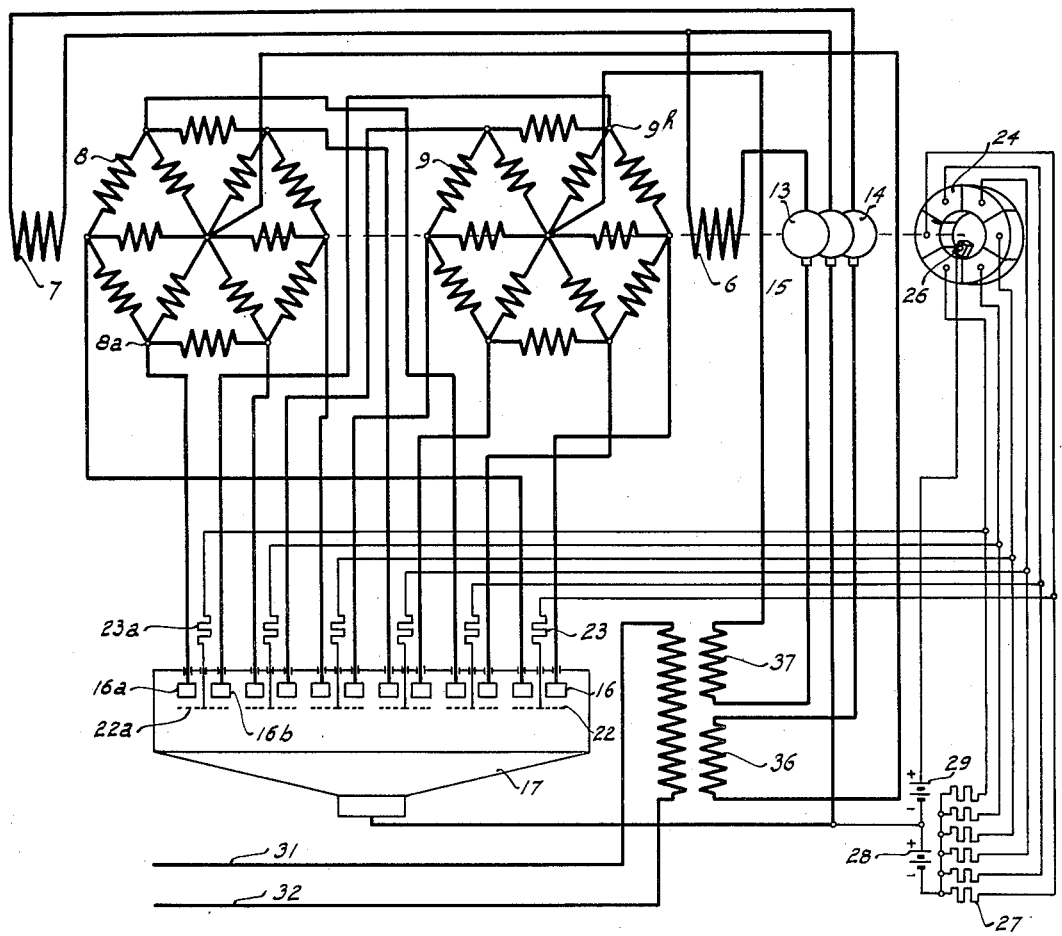
Figure 4:
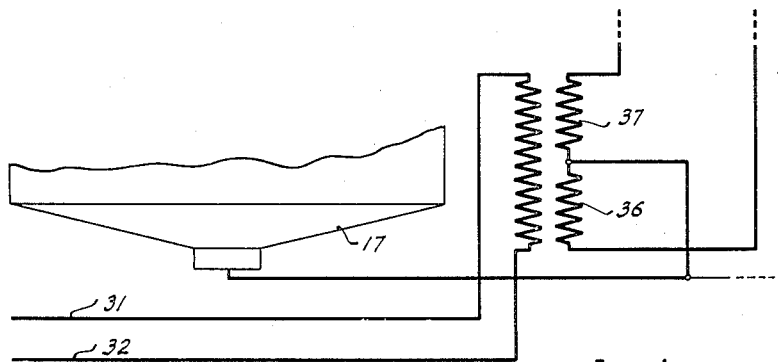

Objects and advantages, other than those above set forth, will be apparent from the following description when read in connection with the accompanying drawings in which Figure 1 diagrammatically illustrates one embodiment of the invention in which the armature windings are displaced in phase, Figure 2 diagrammatically illustrates an embodiment of the invention in which the armature windings are in the same phase, Fig. 3 diagrammatically illustrates an embodiment of the invention in which the armature windings are supplied with alternating-current rather than with direct-current as in Figs. 1 and 2, and Fig. 4 diagrammatically illustrates a portion of the embodiment of Fig. 3 in a slightly modified form.

Referring more particularly to the drawings by characters of reference, the reference numerals 6 and 7 designate the field windings of a direct-current motor; 8 and 9 designate the closely magnetically linked armature windings of a direct-current motor, and 11 and 12 designate damping windings forming a portion of the motor structure.

The field windings 6 and 7 are supplied with direct-current from a suitable source over the slip-rings 13 and 14 and the several portions of the armature windings 8 and 9 are connected, at their connection points, to anodes 16 of an electric current rectifier 17 preferably of the metallic arcing vapor type. The neutral points of the windings 8 and 9 are connected with the secondary winding 18, the primary winding 19 of which is supplied with current of a suitable frequency from an alternator 21. The damping windings 11 and 12 are preferably constructed as squirrel cage windings to decrease the resulting reactance of the commutating winding sectors to a fraction and also to decrease the necessary apparent load for the auxiliary alternating current source.

The anodes 16 of the rectifier are each controlled by a grid 22 which is connected through a resistance 23 with a commutator structure including a plurality of segments 24 and a brush 26 and through resistances 27 with sources of direct-current 28 and 29. The brush 26 is on the same shaft with the alternator 21 and the direct current motor armature windings 8 and 9.

If direct current is supplied to the minus and plus bus-bars 31 and 32 respectively, the transformer 18, 19 supplies a voltage of a suitable frequency, and the commutator brush 26 is rotated at such speed as to pass over each segment 24 during each half period of the alternating current, the direct-current flowing in each of the windings 8 and 9 produces a rotating field, the frequency of which is equal to the speed per second of the commutator. The several anodes are current conductive in sequence and the grids also receive a positive impulse in sequence. The grid to cathode voltage must be kept at a negative value between operating periods of the anodes so that, after each commutation period, each anode is unable to fire in spite of an increasing positive anode voltage. The grid control system must accordingly supply a positive impulse to the grids in the same sequence as the anodes are required to operate.

Considering the system in the condition shown in Fig. 1, the operation thereof will be clear from the following which sets forth the circuits energized during a constantly recurring cycle requiring $\frac{1}{2}$ of a revolution of the armature. When direct-current is supplied to the bus-bars 31 and 32, current flows from the bus-bar 32 to the transformer secondary 18, to the neutral point of winding 8, to winding connection 8a, to anode 16a, to slip-ring 13 and through field windings 6 and 7 to slip-ring 14 and back to the bus-bar 31. The brush 26 at the same time supplies a positive voltage from the battery 29 to the commutator 24 and through resistance 23a to grid 22a.

All of the other grids are kept at a negative potential from battery 28 through resistance 27 and the remaining resistances 23. During the next moment of operation current flows from the bus-bar 32 through secondary winding 18 of the transformer to the neutral point of armature winding 9, to winding connection point 9b, to anode 16b, to slip-ring 13, through field windings 6 and 7, to slip-ring 14 and back to the bus-bar 31. A positive voltage is simultaneously applied from the battery 29 through the brush 26, to the commutator 24, through resistance 23b, to grid 22b. All of the remaining grids are kept at negative potential from the battery 28 through the resistances 27 and 23. The current in anode 16a passes through zero due to the action of the alternating current in transformer 18, 19 and is quenched and re-ignition does not take place until the armature has made one complete revolution. Cycles of operation similar to the above take place in sequence for each pair of winding connection points and are therefore not here set forth in detail.

A pulsating direct current, due to the valve action of the rectifier, thus flows through both the alternating source 18, 19 as well as through the armature windings 8 and 9. If such pulsating current is divided into its direct current and alternating current components, the direct current component is necessary to develop the useful torque of the motor while the alternating current component is necessary only to control the anodes as will be understood from the descriptions above. The alternating field produced by the alternating component results in increased iron losses and the formation of an inductive bucking voltage which requires a certain apparent load for the passage of the auxiliary alternating current through the armature windings.

To reduce the alternating field as much as possible, the windings are closely coupled to obtain equalization of the magneto-motive forces. Due to the fact that the pulsating direct-current also flows through the alternating current source, the alternating components will exert the usual back-action on the source but the direct current component is here very undesirable for the reason that it produces a constant basic magnetization of the iron in the alternating current source. If the source is a generator, increased compensation currents and increased losses arise. If the source is a transformer, the direct current component, as a result of the unsymmetric magnetization of the core, causes increased iron and copper losses. In both cases, the direct current component produces an undesired additional action which requires magnetic compensation. Such compensation is preferably obtained by forming the alternating current source also with double winding such as is shown in the transformer winding 18.

Fig. 2 shows an embodiment of the invention in which the armature windings 8 and 9 are in phase unity. In operation, the circuits energized for the portion of the cycle of operation are exactly like that described for Fig. 1 and need not be repeated. The second portion of the cycle is however slightly different and is as follows: Current flows from bus-bar 32 to the neutral point of secondary winding 18, to connection point 9b, to anode 16b, to slip-ring 13, through field windings 6 and 7 to slip-rings 14 and back to bus-bar 31.

Brush 26 applies a positive voltage from battery 29 to commutator 24 and through resistance 23a to grid 22a. All of the other grids are kept at a negative potential as before until the current in anode 16a passes through zero and a negative voltage is applied to grid 22a after anode 16b has ignited but before anode 16a tends to reignite due to the action of the transformer 18, 19. The current is thus interrupted at both anodes 16a and 16b.

Fig. 3 illustrates an embodiment of the invention differing from those previously described in that alternating current is used in place of direct current which naturally requires differences in structure and arrangement, chief of which is the provision of a third slip-ring 15 and a supply transformer, the secondary windings of which are designated at 36 and 37 and the omission of the alternator 21 with the transformer 18, 19. In operation, a positive impulse is transmitted from the secondary winding 36 to the neutral point of armature winding 8, during one half cycle of the supply voltage to connection point 8a, to anode 16a, to slip-ring 15, to field winding 7 and through slip-ring 14 back to the secondary winding 36. A positive voltage is applied from the battery 29 through the brush 26 to the commutator 24 and through resistance 23a to grid 22a. All of the other grids are kept at a negative potential from battery 28 over resistances 27 and 23. During the next half cycle, the current flows from secondary winding 37 to the neutral point of winding 9 to connection point 9h, to anode 16b, to slip-ring 15 and in a reverse direction through field winding 6 and slip-ring 13 back to the secondary windings 37. The grid control circuits are exactly like those above described and are therefore not repeated. The above sequence of operations is repeated for every cycle of the supply voltage. When the motor begins to rotate, the current circulates successively in the different portions of magnetically linked armature windings 8 and 9 as described.

In Fig. 4, the rotor or field of the motor is preferably short-circuited and supplied with current by induction from stator windings 8 and 9, and secondary windings 36 and 37 are connected directly to the cathode of the rectifier 17. This embodiment of the invention permits use of the structure as a repulsion motor.

Although but a few embodiments of the present invention have been illustrated and described, it will be apparent to those skilled in the art that various changes and modifications may be made therein without departing from the spirit of the invention or from the scope of the appended claims.

The invention claimed is:

1. In a commutating system for dynamo electric machines, a dynamo electric machine comprising a plurality of operating windings each divided into a plurality of sections, a source of electric current supply therefor, and an electric valve means operable to periodically effect the operative connection and disconnection of said source of current sequentially with and from the respective sections of said windings in alternating order with respect to said windings.

2. In a commutating system for dynamo electric machines, a dynamo electric machine comprising a plurality of armature windings each divided into a plurality of sections, a source of electric current supply therefor, and an electric valve means operable to periodically effect the operative connection of said source of current sequentially with the respective sections of said windings, the sequential connections of said sections of one of said windings alternating with the sequential connections of the sections of another of said windings.

3. In a dynamo electric machine, the combination of a plurality of magnetically linked armature windings each divided into a plurality of sections, a source of electric current supply therefor, an electric valve means operable to periodically effect the operative connection of said source of current sequentially with the respective sections of said windings in alternating order with respect to the said windings, and means operable to cause interruption of the connection of said source of current with any one of said sections upon the connection of said source with another of said sections.

4. In a dynamo electric machine, the combination of a plurality of operating windings each divided into a plurality of sections, a source of operating current supply therefor, electric valve means operable to periodically establish and interrupt operative connection of said source sequentially with and from the respective sections of said windings in alternating order with respect to said windings, and control means operable to cause said valve means to effect the said sequential operative connections and interruptions of said source of current with said sections of said windings.

5. In a dynamo electric machine, the combination of a plurality of operating windings each divided into a plurality of sections, a source of direct current for energizing said windings, an electric valve means operable to establish operative connection and disconnection therethrough of said source of current with and from the sections of said windings, control means operable to cause said valve means to periodically effect said connections sequentially with the respective sections of said windings in alternating order with respect to said windings, and means operable to cause interruption of said connection of said source with any one of said sections upon the connection of another of said sections with said source.

6. In a commutating system for dynamo electric machines, a dynamo electric machine comprising a plurality of operating windings each divided into a plurality of sections, a source of electric current supply for energizing said windings, an electric valve means operable to establish operative connection and disconnection therethrough of said source of current with and from each section of each said winding, control means operable to cause said valve means to periodically effect said operative connections sequentially with the respective sections of said windings in alternating order with respect to the said windings, a source of alternating current, and means operable to cause the last said source of current to be operatively superimposed upon the first said current to cause said valve means to periodically interrupt said connection of the first said source of current with any one of said sections upon the said operative connection of another of said sections with the first said source of current.

7. In a dynamo electric machine, the combination of a plurality of operating windings each divided into a plurality of sections, a source of alternating current supply for said windings, an electric valve means operable to establish connection and disconnection therethrough of said source of current with and from each section of said windings to effect operative energizations of said windings, and control means operable to cause said valve means to periodically effect said operative connection of said current sequentially with the respective sections of said windings in alternating order with respect to said windings, the said source of current being also operable to effect interruption of said operative connections thereof with the said sections of the windings.

8. In a dynamo electric machine, the combination of a plurality of operating windings each divided into a plurality of sections, a source of electric current operable to energize said windings, an electric valve means comprising a cathode and a plurality of anodes equal in number to and connected respectively to each section of said windings, control means associated with each said anode operable to control the operative connection of said source of current by way of said anodes and said cathode with the sections of said windings, and means operable to affect the said control means in such a manner as to periodically effect the operative connection of said source of current sequentially with the respective sections of said windings in alternating order with respect to said windings, the said means being also operable to affect the said control means in such a manner as to prevent said operative connection of said source of current with any other of said sections during the said operative connection of any one of said sections.

9. In a dynamo electric machine, the combination of a plurality of magnetically linked operating windings each divided into a plurality of sections, a source of alternating current for energizing said windings, an electric valve means comprising a cathode, a plurality of anodes equal in number to and connected respectively to each said section of said windings, a control electrode associated with each said anode, means operable to to affect the said control electrodes in such a manner as to cause the said source of current to be periodically operatively connected by way of said anodes and cathode sequentially with the respective sections of said windings in alternating order with respect to said windings, and means operable to affect the said control electrodes in such a manner as to prevent the operative connection of said source of current with any other of said sections during the said operative connection of any one of said sections, the said alternating current being operative to effect the said operative disconnection thereof responsive to the reduction of the potential thereof to zero value.

10. In a dynamo electric machine, the combination of a plurality of magnetically linked armature windings each divided into a plurality of sections and a plurality of field excitation windings, a source of current supply for energizing each of said windings, an electric valve comprising a cathode, a plurality of anodes equal in number to and connected respectively with each said section of each of said armature windings, a control electrode associated with each said anode, means operable to sequentially affect each said electrode in such a manner as to cause the said source of current to be periodically operatively connected sequentially with the respective sections of said armature windings in alternating order with respect to said windings and serially with one and another of said field windings by way of said anodes and said cathode, and means operable to affect said electrodes in such a manner as to prevent the said operative connections of said source of current with the said sections of said armature windings.

11. In a dynamo electric machine, the combination of an armature winding divided into a plurality of sections, a second armature winding divided into a plurality of sections displaced in phase with respect to the first said winding, a source of electric current supply for energizing said windings, an electric valve of the metallic vapor type comprising a cathode, a plurality of anodes equal in number to and connected respectively with each section of said windings, the said valve being operable to periodically effect the operative connection of said source of current sequentially with the said sections of said windings in alternating order with respect to said windings, a control electrode associated with each said anode, a plurality of resistances and a source of direct current connected with said electrodes in such a manner as to normally impress upon each said electrode a potential more negative than the potential of said cathode whereby the said operative connections of the first said source of current with the said windings is prevented.

12. In a commutating system for dynamo electric machines, a dynamo electric machine comprising a plurality of armature windings each divided into a plurality of spacially displaced sections in such a manner that each of the sections of one of said windings is displaced in phase with respect to the adjacent sections of another of said windings, a source of electric current supply for energizing said windings, an electric valve of the metallic vapor type comprising a cathode, a plurality of anodes equal in number to and connected respectively with each section of said windings, a control electrode associated with each said anode, the said valve being operable to periodically effect the operative connection therethrough of said source of current sequentially with respective sections of said windings in alternating order with respect to said windings, a source of current connected with each said control electrode in such a manner as to normally impress upon each said electrode a potential more negative than the potential of said cathode to prevent the said operative connection of the first said source of current with the said windings, another source of current, and means operable to effect the connection and disconnection of the said another source of current with and from each of said electrodes in such a manner as to periodically and sequentially impress upon each of said electrodes a potential more positive than the potential of the said cathode whereby the said sequential operative connections of the first said source of current with the said sections of said windings is effected.

ERWIN KERN.